US009389942B2

(12) United States Patent
Raj et al.

(10) Patent No.: US 9,389,942 B2
(45) Date of Patent: Jul. 12, 2016

(54) DETERMINE WHEN AN ERROR LOG WAS CREATED

(71) Applicant: Intel Corporation, Santa Clara, CA (US)

(72) Inventors: Ashok Raj, Portland, OR (US); Narayan Ranganathan, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 98 days.

(21) Appl. No.: 14/057,485

(22) Filed: Oct. 18, 2013

(65) Prior Publication Data

US 2015/0113334 A1    Apr. 23, 2015

(51) Int. Cl.
*G06F 11/00*    (2006.01)
*G06F 11/07*    (2006.01)

(52) U.S. Cl.
CPC ........ *G06F 11/0787* (2013.01); *G06F 11/0706* (2013.01)

(58) Field of Classification Search
CPC ............ G06F 11/2284; G06F 11/1441; G06F 11/1417; G06F 11/3055
See application file for complete search history.

(56) References Cited

U.S. PATENT DOCUMENTS

| 7,131,026 | B2* | 10/2006 | Denninghoff et al. | 714/6.3 |
|---|---|---|---|---|
| 7,451,064 | B2* | 11/2008 | Hodge et al. | 702/187 |
| 8,713,367 | B2* | 4/2014 | Deng et al. | 714/23 |
| 8,930,455 | B2* | 1/2015 | Kan et al. | 709/204 |
| 2005/0144532 | A1 | 6/2005 | Dombrowa et al. | |
| 2006/0107125 | A1 | 5/2006 | Hsu et al. | |
| 2007/0174604 | A1* | 7/2007 | Wang et al. | 713/2 |
| 2007/0245170 | A1* | 10/2007 | Crowell et al. | 714/36 |
| 2008/0126852 | A1 | 5/2008 | Brandyberry et al. | |
| 2013/0166641 | A1* | 6/2013 | Kan et al. | 709/204 |

FOREIGN PATENT DOCUMENTS

JP    2007109238 A    4/2007

OTHER PUBLICATIONS

Microsoft Developer Network, "Clean, Cold, and Warm Booting (Windows Embedded CF. 6.0)", Mar. 7, 2013, (http://web.archive.org/web/20130307193951/http://msdn.microsoft.com/en-us/library/ee490762 (v=winembedded.60).aspx), 1 page.

* cited by examiner

*Primary Examiner* — Christopher McCarthy
(74) *Attorney, Agent, or Firm* — International IP Law Group, P.L.L.C.

(57) ABSTRACT

A computing system can include a machine check counter (MCC) including a current value. The current value indicates a system reboot resetting hardware of the computing system. The machine check counter includes a model specific register including a counter indicating the current value, the current value to be incremented upon the system reboot.

21 Claims, 6 Drawing Sheets

300

400

DETERMINE WHEN AN ERROR LOG WAS CREATED

TECHNICAL FIELD

The present techniques relate generally to error logs. In particular, the present techniques relate to determining if an error log was created before a current system boot.

BACKGROUND

Computer hardware errors can occur when a central processing unit (CPU) detects a hardware problem. Examples of hardware errors include system bus errors, memory errors, and cache errors, among others. These hardware errors can be caused by overclocking, overheating of the hardware components, power supply issues, or problems with software, among others. Uncorrected hardware errors typically result in a system restart if software determines they are not recoverable.

BRIEF DESCRIPTION OF THE DRAWINGS

Certain examples are described in the following detailed description and in reference to the drawings, in which.

The same numbers are used throughout the disclosure and the figures to reference like components and features. Numbers in the 100 series refer to features originally found in FIG. 1; numbers in the 200 series refer to features originally found in FIG. 2; and so on.

DETAILED DESCRIPTION OF SPECIFIC EMBODIMENTS

Examples disclosed herein provide techniques for determining when an error log was created. Machine check exception (MCE) is a signaling mechanism to report uncorrected errors detected in a computing system to system software. For fatal errors, the Operating System (OS) will typically log the critical event and initiate a system reboot. In some cases, platform software will initiate a warm reboot (i.e., a reboot in which the power to the system is not interrupted) in order to help retain the error logs in hardware registers and to achieve error containment quickly. When the platform software initiates a warm reboot, the OS is prevented from creating a log or performing a crash dump for later analysis.

Error logs are stored in hardware registers. A hardware register can be associated with each hardware component of the computing system, such as the CPU and the memory. These hardware registers, which store error logs, are sticky in nature, meaning that the contents of the registers are retained during a warm reboot and can be read by platform software (e.g., BIOS), or system software such as an operating system (OS)/virtual machine manager (VMM) after the warm reboot. Following a warm reboot, the system software can access the hardware registers to retrieve error information. However, the OS and platform software is unable to identify when the error log was created. As such, the OS and the platform software cannot determine if the error log being accessed was logged prior to the warm reboot or if the error log is a new log describing an error encountered during the warm reboot.

According to the present techniques, a machine check counter (MCC) is described herein. The machine check counter can be a register including a counter which displays a current value indicating the number of system reboots which have been performed. The counter is incremented upon completion of a successful warm reboot. A reboot is regarded as successful when the processor successfully completes a reset sequence and proceeds to fetch and execute platform firmware, such as BIOS. The current value in machine check counter can be compared to a logged current value, the current value in the machine check counter at the time of creation of the error log, to determine if an error log was created before the current system boot or before a system reboot.

Figure 1:
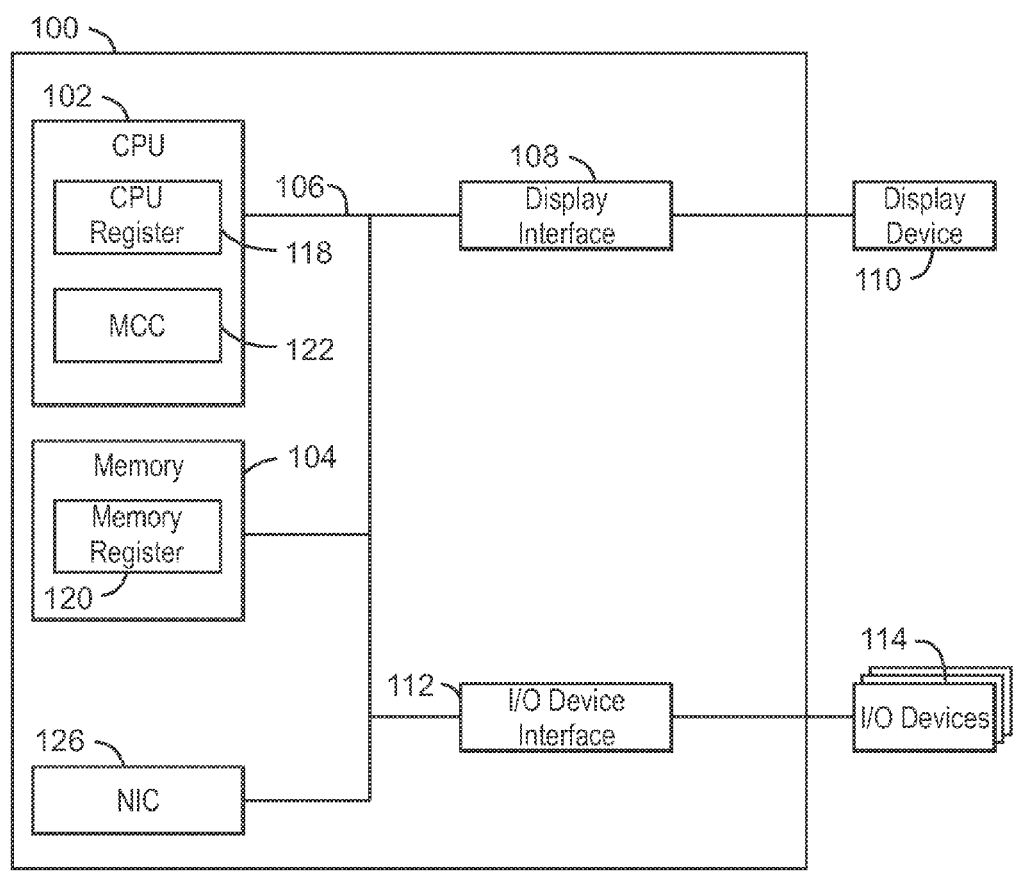
FIG. 1 is a block diagram of an example of a computing system.

FIG. 1 is a block diagram of an example of a computing system 100. The computing system 100 may be any suitable type of computing system including, for example and without limitation, a desktop computer, tablet computer, laptop computer, a system on a chip (SoC), and the like. The computing system 100 can include a central processing unit (CPU) 102 to execute stored instructions, as well as a memory device 104 that stores instructions that are executable by the CPU 102. The CPU 102 can be coupled to the memory device 104 by a bus 106. Additionally, the CPU 102 can be an SoC, single core processor, a multi-core processor, or any number of other configurations. Furthermore, the computing system 100 can include more than one CPU 102.

The memory device 104 can include random access memory (RAM), read only memory (ROM), flash memory, or any other suitable memory systems. For example, the memory device 104 can include dynamic random access memory (DRAM). The CPU 102 can be linked through the bus 106 to a display interface 108 to connect the computing system 100 to a display device 110. The display device 110 can include a display screen that is a built-in component of the computing system 100. The display device 110 can also include a computer monitor, television, or projector, among others, that is externally connected to the computing system 100. The CPU 102 can also be linked through the bus 106 to an I/O interface 112 to connect the computing system 100 to an I/O device(s) 118. The I/O devices 114 can be any type of I/O devices including, but not limited to, storage devices and printers.

A network interface card (NIC) 116 can connect the computing system 100 through the system bus 106 to a network (not depicted). The network (not depicted) can be a wide area network (WAN), local area network (LAN), or the Internet, among others. In an example, the computing system 100 can connect to a network via a wired connection or a wireless connection.

The computing system 100 can include a plurality of hardware registers 118-120. The hardware registers can include a CPU register 118 and a memory register 120, as well as any other registers associated with the hardware components of the computing system 100. The hardware registers 118-120 store error logs. The error logs contain information relating to an error experienced by the hardware components to which the hardware register 118-120 is associated. The error logs can include a logged current value to indicate the current value of a machine check counter at the instant the error occurred.

The computing system 100 can also include a machine check counter (MCC) 122. The machine check counter 122 can be a register, such as a model specific register (MSR). In an example, the machine check counter 122 can be a read-only register. The machine check counter 122 can be a package scoped (i.e., accessible by all error reporting hardware in the computing system) register. In an example, the machine check counter can be sticky across a warm reboot (i.e., restarting the system without interrupting power) and the contents of the machine check counter can be cleared upon a cold reboot of the system (i.e., restarting the system after power is interrupted). The machine check counter 122 can be a register that is accessible by all error reporting hardware components of the computing system 100.

The machine check counter 122 includes a counter that indicates a current value. The current value denotes the current boot of the system, thereby tracking the number of warm system reboots the system has undergone. The counter can be automatically incremented by hardware, upon a successful warm reboot. It is to be understood that while the machine check counter 122 is shown here as being located in the CPU 102, the machine check counter 122 can be located in any suitable component of the computing system 100.

It is to be understood the block diagram of FIG. 1 is not intended to indicate that the computing system 100 is to include all of the components shown in FIG. 1 in every case. Further, any number of additional components can be included within the computing system 100, depending on the details of the specific implementation.

Figure 2:
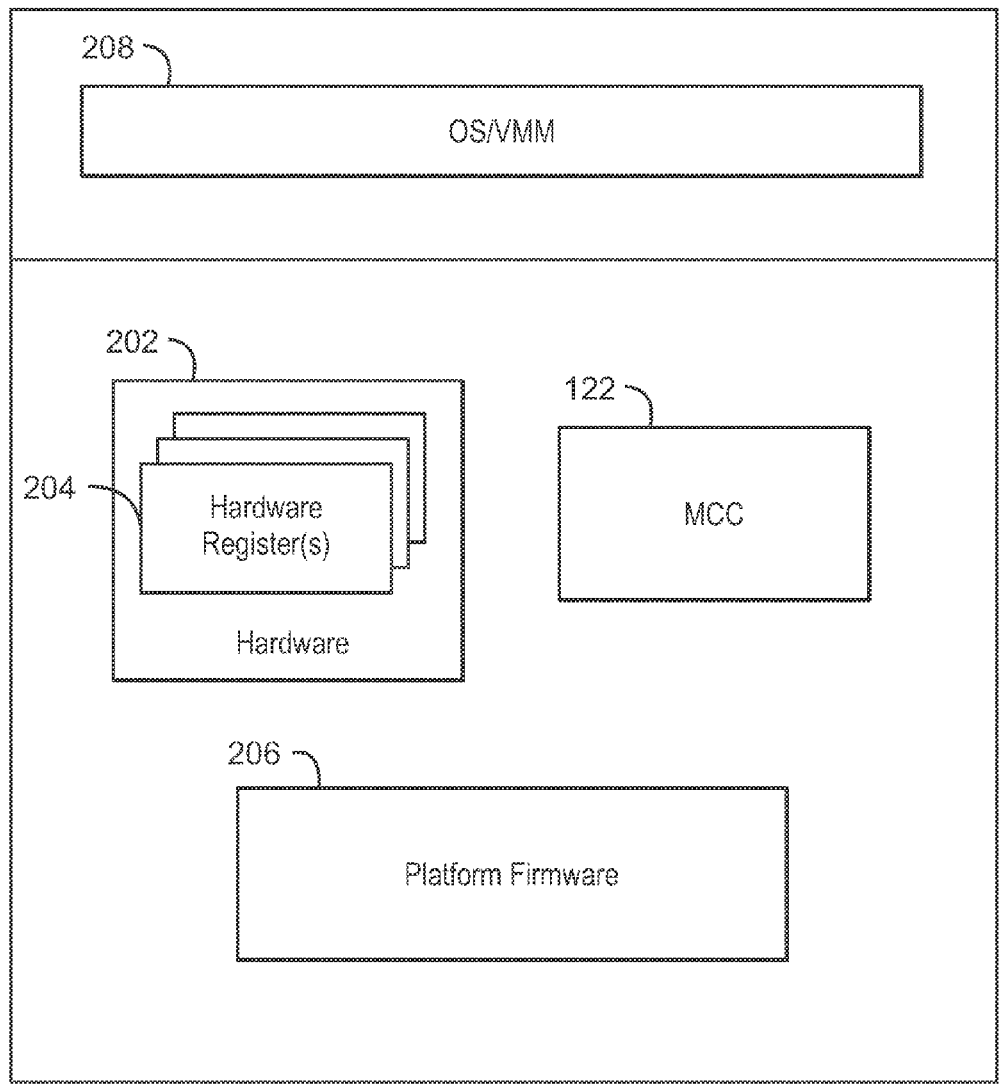
FIG. 2 is a block diagram of an example of another computing system.

FIG. 2 is a block diagram of an example of another computing system. The computing system 200 includes hardware 202, such as CPU 102 and memory 104, among others. The hardware 202 includes hardware register(s) 204, such as CPU register 118 and memory register 120, each hardware register 204 associated with a hardware component of the computing system 200.

The computing system 200 also includes platform firmware 206. The platform firmware 206 can be any type of firmware, such as a basic input/output system (BIOS), among others. The computing system 200 further includes a machine check counter 122 including a current value to indicate the current system boot. The machine check counter 122 can also include an indication of whether the OS/VMM 208 or the platform firmware 206 was operating at the time of the error. When error producing components access the machine check counter before making an error log, hardware will ensure the machine check counter reflects the state of Systems Management Mode (SMM) in the machine check counter register. Reflecting the state of the Systems Management Mode (SMM) further distinguishes whether the log occurred when the platform or processor was under BIOS control when the error was logged.

The computing system 200 further includes an operating system (OS) or Virtual Machine Manager (VMM), depending on the specific implementation of the computing system 200.

The hardware registers 204 store error logs that are generated when the hardware 202 experiences an error. An error log lists information relating the error and includes a logged current value. The logged current value is the current value as listed by the machine check counter 122 when the error log is created. The platform firmware 206 and/or the OS 208 is notified when an error log is created. The platform firmware 206 or the OS/VMM 208 can access the error log to collect error information. The platform firmware 206 and/or the OS/VMM 208 can access the machine check counter 122 to determine the current value and compare the current value to the logged current value to determine if the error log was created prior to the current system boot. The platform firmware 206 and/or the OS/VMM 208 can also access the machine check counter 122 to determine if the platform firmware 206 or the OS/VMM 208 was operating at the time of the error.

It is to be understood the block diagram of FIG. 2 is not intended to indicate that the computing system 200 is to include all of the components shown in FIG. 2 in every case. Further, any number of additional components can be included within the computing system 200, depending on the details of the specific implementation.

Figure 3:
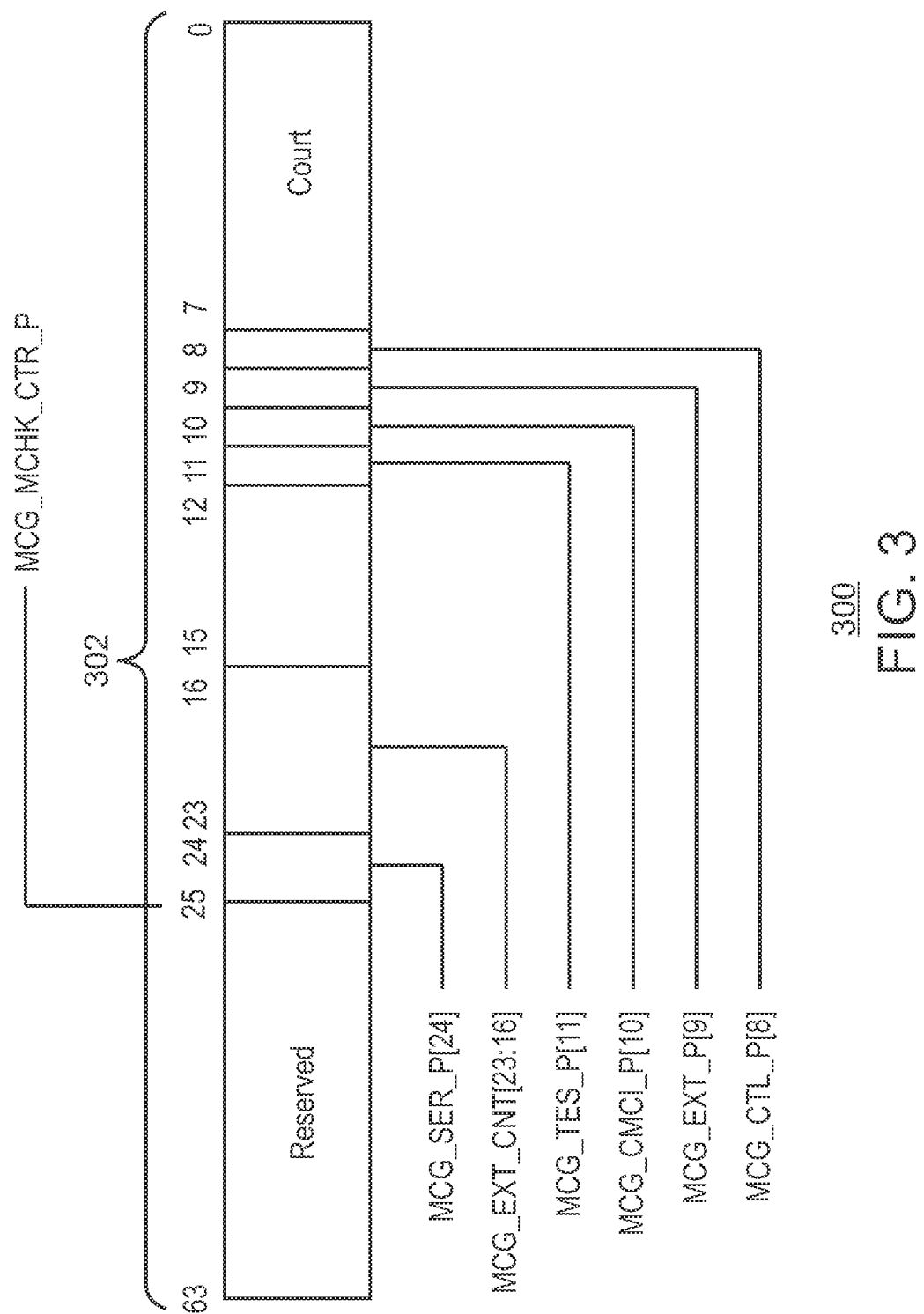
FIG. 3 is a block diagram of an example of a register.

FIG. 3 is block diagram of an example of a register 300. The register 300 can be a register that enumerates the capabilities of the hardware in a computing system. For example, the register 300 can be an IA32_MCG_CAP register. The bits 302 of the register indicate the hardware capabilities. Each bit 302 is numbered (e.g., 0-63) and is labeled to indicate the hardware to which the bit 302 refers. A previously unused bit 302 of the register can be designated to indicate the presence of a Machine Check Counter (MCC). For example, bit 25 can be designated MCG_MCHK_CTR_P to indicate the presence of a machine check counter (MCC).

It is to be understood the block diagram of FIG. 3 is not intended to indicate that the register 300 is to include all of the components shown in FIG. 3 in every case. Further, any number of additional components can be included within the register 300, depending on the details of the specific implementation.

Figure 4:
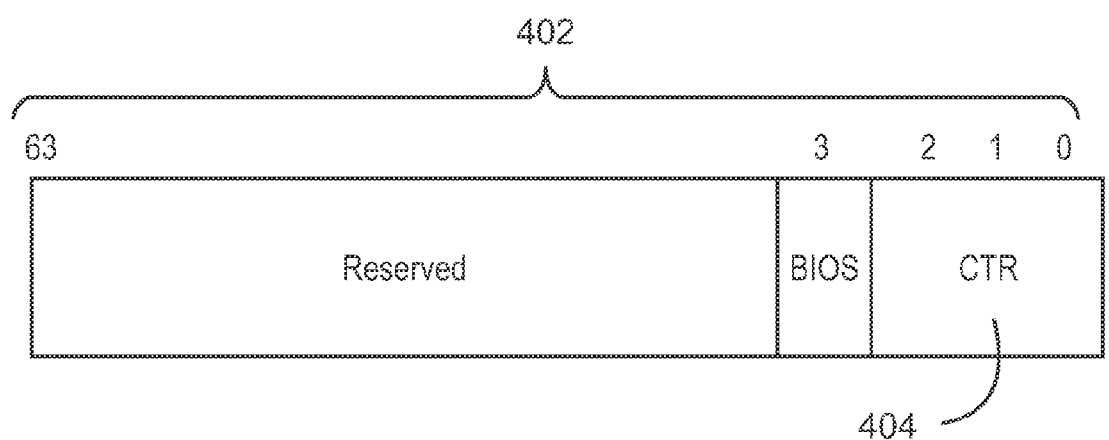
FIG. 4 is a block diagram of an example of a machine check counter.

FIG. 4 is a block diagram of an example of a machine check counter. The machine check counter can be a model specific register (MSR), such as a read-only register, that is a package scoped (i.e., accessible by all error-reporting hardware in the computing system) register. The machine check counter can include a plurality of bits 402 that are numbered (e.g., 0-63). In an example, the machine check counter can be sticky across a warm reboot (i.e., restarting the system without interrupting power) and the contents of the machine check counter can be cleared upon a cold reboot of the system (i.e., restarting the system after power is interrupted).

The machine check counter includes a counter 404. For example, the machine check counter can include a counter 404 at bits 0-2. The counter 404 can be incremented, such as automatically incremented, upon a successful warm reboot. The machine check counter can also include a facility to indicate if a log was created when the BIOS of a computing system was running or when the OS was running. For example, bit 3 can be set automatically when a computing system is in system management mode (SMM) to indicate when the BIOS is running.

It is to be understood the block diagram of FIG. 4 is not intended to indicate that the machine check counter 400 is to include all of the components shown in FIG. 4 in every case. Further, any number of additional components can be included within the machine check counter 400, depending on the details of the specific implementation.

Figure 5:
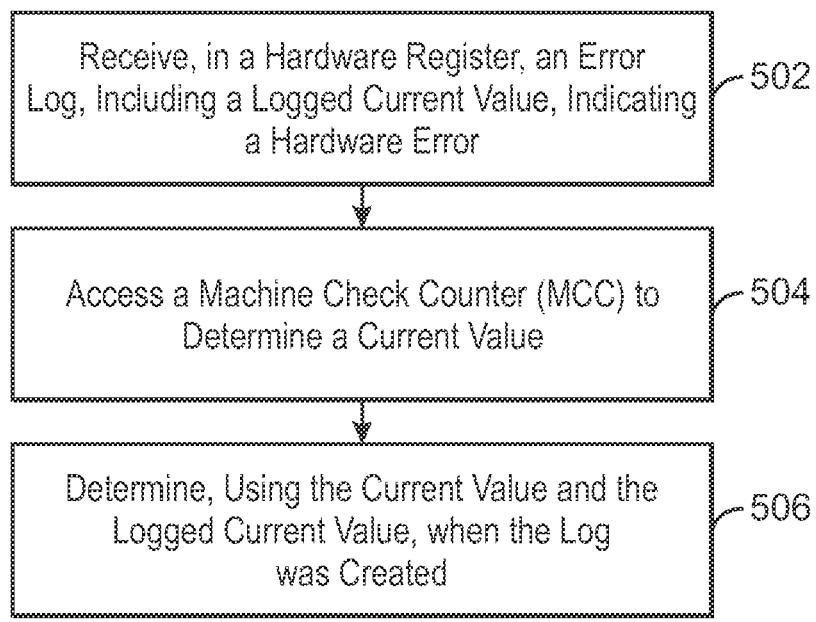
FIG. 5 is a process flow diagram of an example of a method of determining when an error log was created.

FIG. 5 is a process flow diagram of an example of a method of determining when an error log was created. At block 502, an error log, including a logged current value, indicating a hardware error can be received in a hardware register. The logged current value is the current value at the time the error log was created. The error log can indicate an error in any type of hardware in a computing system, such as a CPU or memory. The error log can be created in the hardware register of the type of hardware suffering the error. A notification of the error log can be received in the platform firmware or the operating system. The platform firmware or the operating system can perform an action to contain the error. For example, a warm reboot of the computing system can be enacted.

At block 504, a machine check counter (MCC) can be accessed to determine the current value. The machine check counter is a register that includes a counter. The counter is incremented upon a successful warm reboot of the system. The current value indicates if a warm reboot, and how many, has occurred.

At block 506, when the log was created can be determined by using the current value and the logged current value. In determining when the log was created, the current value can be compared to the logged current value and any difference between the two values noted as an indication of when the log was created. For example, the operating system or the platform firmware can determine when the log was created. Determining when the log was created can include determining if the log was created before a system reboot or during a system reboot, among others.

It is to be understood the process flow diagram of FIG. 5 is not intended to indicate that the method 500 is to include all of the components shown in FIG. 5 in every case. Further, any number of additional components can be included within the method 500, depending on the details of the specific implementation.

Figure 6:
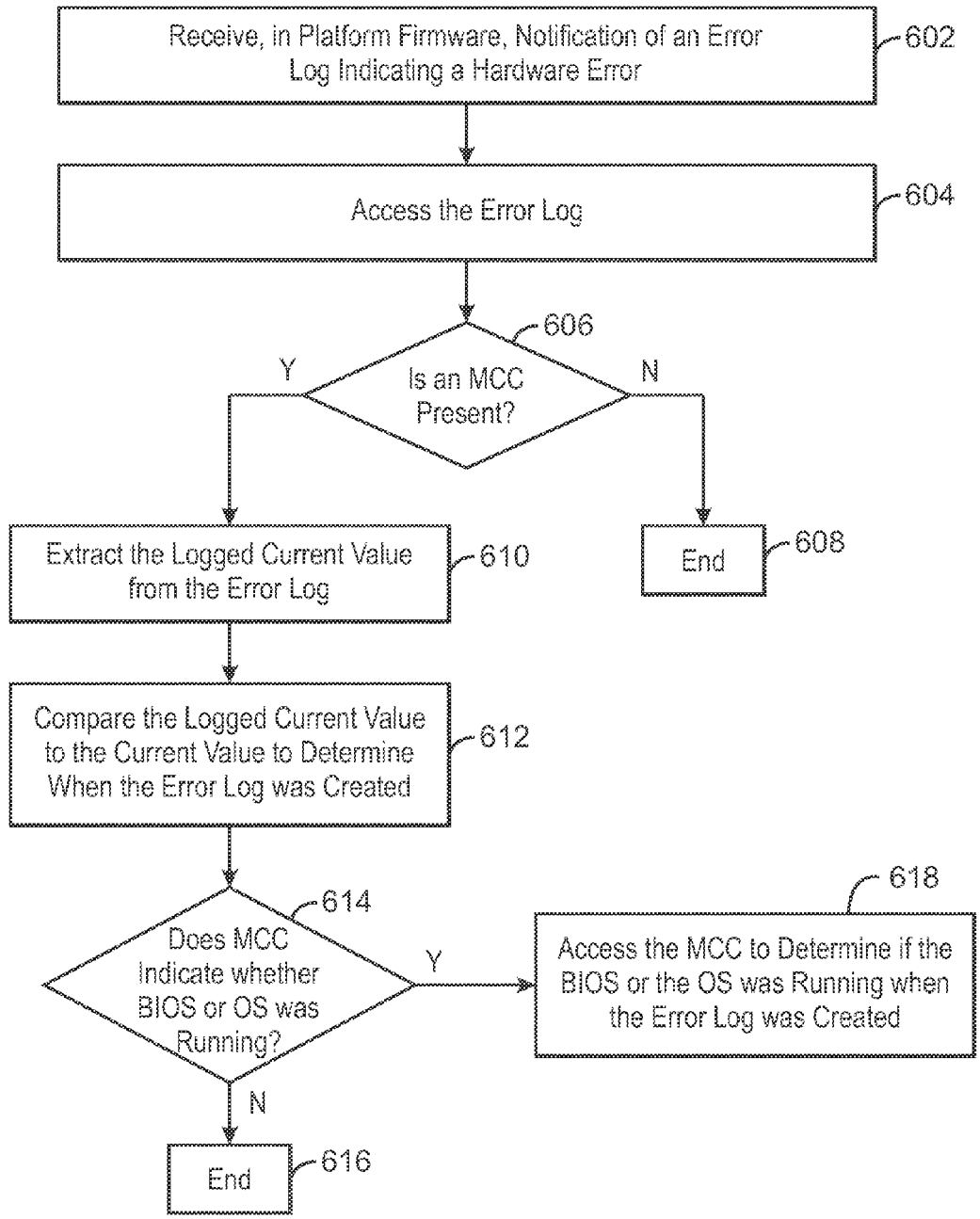
FIG. 6 is a process flow diagram of an example of another method of determining when an error log was created.

FIG. 6 is a process flow diagram of an example of another method of determining when an error log was created. At block 602, a notification of an error log indicating a hardware error can be received in the platform firmware. The notification be received prior to a system reboot or after a system reboot. At block 604, the platform firmware can access the error log.

At block 606, the platform firmware can determine if a memory check counter (MCC) is present. In order to determine if a machine check counter is present, the platform firmware can access a register that enumerates the hardware capabilities of the computing system, such as register 300 of FIG. 3. The machine check counter includes a counter that is incremented upon completion of a successful warm reboot. If a machine check counter is not present, the method can end at block 608. If a machine check counter is present, the logged current value from the error log can be extracted from the error log at block 610. The logged current value is the current value as read when the error log was created. The logged current value can be logged in the hardware register of the hardware that experienced the error, such as by inclusion in the error log. In another example, the logged current value can be recorded in the hardware register separately from the error log.

At block 612, the logged current value can be compared to the current value to determine when the error log was created. For example, if the logged current value is determined to be smaller than the current value, the error log can be determined to have been created before a warm reboot. In another example, if the logged current value is determined to be the same as the current value, the error log can be determined to have been created during the warm reboot.

At block 614, the platform firmware can determine if the machine check counter indicates whether the BIOS or the OS was running when the error log was created. If the machine check counter does not provide an indication as to whether the BIOS or the OS was running, the method can end at block 616. If the machine check counter does indicate whether the BIOS or the OS was running, the platform firmware can access the machine check counter to determine if the BIOS or the OS was running when the error log was created.

It is to be understood the process flow diagram of FIG. 6 is not intended to indicate that the method 600 is to include all of the components shown in FIG. 6 in every case. Further, any number of additional components can be included within the method 600, depending on the details of the specific implementation.

Example 1

A computing system is described herein. The computing system includes a machine check counter (MCC) including a current value indicating a current system boot of the computing system. The machine check counter includes a model specific register including a counter indicating the current value, the current value to be incremented upon a warm system reboot.

An error log stored in a hardware register can include a logged current value and the logged current value is to be compared with the current value in the machine check counter to determine when an error log was created. Determining when an error log was created includes determining if an error log was created before the warm system reboot. The logged current value includes a current value indicated by the machine check counter during creation of the error log. The error log includes information relating to an error experienced by a hardware component of the computing system. The machine check counter includes a model specific register that is sticky across a warm system reboot and the machine check counter is cleared upon a cold system reboot. The computing system includes a register enumerating hardware capability of the computing system, the register including a bit assigned to indicate the presence of the machine check counter in the computing system.

Example 2

A computing system is described herein. The computing system includes a hardware register to store an error log including information relating to a hardware error. The computing system also includes a machine check counter (MCC) including a model specific register to indicate a current value, the current value to indicate a current system boot. The error log includes a logged current value including a current value upon creation of the error log, the current value to be compared with the logged current value to determine when the error log was created.

The computing system can include a register enumerating the hardware capability of the computing system, the register including a bit assigned to indicate the presence of the machine check counter in the computing system. The current value can be automatically incremented upon completion of a warm system reboot. The machine check counter can be sticky across a warm system reboot and the machine check counter can be cleared upon a cold system reboot. The logged current value is to be compared with the current value to determine when an error log was created. Determining when an error log was created can include determining if an error log was created before the warm system reboot. The machine check counter includes a read-only register. The machine check counter indicates whether BIOS of the computing system or an operating system (OS) of the computing system was running when the error log was created. A bit of a machine check counter can be set to indicate whether BIOS of the computing system or an operating system (OS) of the computing system was running when the error log was created.

Example 3

A computing system is described herein. The computing system includes logic to access an error log stored in a hardware register. The computing system also includes logic to access a machine check counter (MCC) to determine a current value, the current value indicating a current system boot. The computing system further includes logic to determine, using the current value, when the error log was created.

The computing system can further include logic to access a register enumerating hardware capabilities to determine the presence of the machine check counter in the computing system. The computing system can further include logic to access the machine check counter to determine whether BIOS of the computing system or an operating system (OS) of the computing system was running when the error log was created. Determining when the error log was created can include determining if the error log was created before the current system boot. The machine check counter can include a read-only register. The error log can include a logged current value include a current value during creation of the error log. Determining when the error log was created can include comparing the logged current value to the current value and analyzing differences between the logged current value and the current value.

In the foregoing description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

Some embodiments may be implemented in one or a combination of hardware, firmware, and software. Some embodiments may also be implemented as instructions stored on a machine-readable medium, which may be read and executed by a computing platform to perform the operations described herein. A machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices, among others.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the inventions. The various appearances of "an embodiment," "one embodiment," or "some embodiments" are not necessarily all referring to the same embodiments. Elements or aspects from an embodiment can be combined with elements or aspects of another embodiment.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the preceding description, various aspects of the disclosed subject matter have been described. For purposes of explanation, specific numbers, systems and configurations were set forth in order to provide a thorough understanding of the subject matter. However, it is apparent to one skilled in the art having the benefit of this disclosure that the subject matter may be practiced without the specific details. In other instances, well-known features, components, or modules were omitted, simplified, combined, or split in order not to obscure the disclosed subject matter.

While the disclosed subject matter has been described with reference to illustrative embodiments, this description is not intended to be construed in a limiting sense. Various modifications of the illustrative embodiments, as well as other embodiments of the subject matter, which are apparent to persons skilled in the art to which the disclosed subject matter pertains are deemed to lie within the scope of the disclosed subject matter.

While the present techniques may be susceptible to various modifications and alternative forms, the exemplary examples discussed above have been shown only by way of example. It is to be understood that the technique is not intended to be limited to the particular examples disclosed herein. Indeed, the present techniques include all alternatives, modifications, and equivalents falling within the true spirit and scope of the appended claims.

What is claimed is:

1. A computing system, comprising:
   a machine check counter (MCC) comprising a current value indicating a current system boot of the computing system, the machine check counter comprising:
      a model specific register comprising a counter indicating the current value, the current value to be incremented upon a warm system reboot, wherein the model specific register is sticky across a warm system reboot and the machine check counter is cleared upon a cold system reboot.

2. The computing system of claim 1, wherein an error log stored in a hardware register comprises a logged current value and wherein the logged current value is to be compared with the current value in the machine check counter to determine when an error log was created.

3. The computing system of claim 2, wherein determining when an error log was created comprises determining if an error log was created before the warm system reboot.

4. The computing system of claim 2, wherein the logged current value comprises a current value indicated by the machine check counter during creation of the error log.

5. The computing system of claim 2, wherein the error log comprises information relating to an error experienced by a hardware component of the computing system.

6. The computing system of claim 1, wherein the computing system further comprises a register enumerating hardware capability of the computing system, the register comprising a bit assigned to indicate presence of the machine check counter in the computing system.

7. A computing system, comprising:
   a hardware register to store an error log comprising information relating to a hardware error; and
   a machine check counter (MCC) comprising a model specific register to indicate a current value, the current value to indicate a current system boot, wherein the model specific register is sticky across a warm system reboot and wherein the machine check counter is cleared upon a cold system reboot;
   the error log comprising a logged current value comprising a current value upon creation of the error log, the current value to be compared with the logged current value to determine when the error log was created.

8. The computing system of claim 7, wherein the computing system further comprises a register enumerating hardware capability of the computing system, the register comprising a bit assigned to indicate presence of the machine check counter in the computing system.

9. The computing system of claim 7, wherein the current value is automatically incremented upon completion of a warm system reboot.

10. The computing system of claim 7, wherein the logged current value is to be compared with the current value to determine when an error log was created.

11. The computing system claim 7, wherein determining when an error log was created comprises determining if an error log was created before a warm system reboot.

12. The computing system of claim 7, wherein the machine check counter comprises a read-only register.

13. The computing system of claim 7, wherein the machine check counter indicates whether BIOS of the computing system or an operating system (OS) of the computing system was running when the error log was created.

14. The computing system of claim 13, wherein a bit of a machine check counter is set to indicate whether BIOS of the computing system or an operating system (OS) of the computing system was running when the error log was created.

15. A computing system, comprising:
   logic to access an error log stored in a hardware register;
   a machine check counter (MCC) to determine a current value, the current value indicating a current system boot, wherein a model specific register is sticky across a warm system reboot and the machine check counter is cleared upon a cold system reboot; and
   logic to determine, using the current value, when the error log was created.

16. The computing system of claim 15, further comprising:
   logic to access a register enumerating hardware capabilities to determine presence of the machine check counter in the computing system.

17. The computing system of claim 15, further comprising:
   logic to access the machine check counter to determine whether BIOS of the computing system or an operating system (OS) of the computing system was running when the error log was created.

18. The computing system of claim 15, wherein determining when the error log was created comprises determining if the error log was created before the current system boot.

19. The computing system of claim 15, wherein the machine check counter comprises a read-only register.

20. The computing system of claim 15, wherein the error log comprises a logged current value comprising a current value during creation of the error log.

21. The computing system of claim 20, wherein determining when the error log was created comprises comparing the logged current value to the current value and analyzing differences between the logged current value and the current value.

\* \* \* \* \*